United States Patent [19]

Bathellier et al.

[11] Patent Number: 4,764,352
[45] Date of Patent: Aug. 16, 1988

[54] PROCESS FOR PREVENTING THE EXTRACTION OF TECHNETIUM AND/OR RHENIUM, PARTICULARLY DURING THE EXTRACTION OF URANIUM AND/OR PLUTONIUM BY AN ORGANIC SOLVENT

[75] Inventors: André Bathellier, Sceaux; Jean-Yves Pasquiou, Gif sur Yvette; Etienne Vialard, Paris, all of France

[73] Assignee: Commissariat a l'Energie Atomique, Paris, France

[21] Appl. No.: 878,131

[22] Filed: Jun. 25, 1986

[30] Foreign Application Priority Data

Jun. 26, 1985 [FR] France ............................. 85 09712

[51] Int. Cl.$^4$ ............... B01D 11/00; G21C 19/46; G21C 19/50; G21F 9/04
[52] U.S. Cl. ......................... 423/10; 252/626; 252/627; 252/631; 423/9; 423/8; 423/21.5; 423/49; 423/70; 210/682
[58] Field of Search .................. 252/631, 627, 626; 423/2, 3, 7, 8, 10, 11, 22, 49, 69, 70, 21.5; 564/15; 210/682, 684

[56] References Cited

U.S. PATENT DOCUMENTS

| | | | |
|---|---|---|---|
| 2,942,939 | 6/1960 | Beaton | 423/7 |
| 2,982,600 | 5/1961 | Vogler | 423/10 |
| 4,025,602 | 5/1977 | Campbell | 423/7 |
| 4,358,426 | 11/1982 | Tallent | 423/8 |
| 4,443,413 | 4/1984 | Pruett | 423/2 |
| 4,528,165 | 7/1985 | Friedman | 423/10 |
| 4,548,790 | 10/1985 | Horwitz et al. | 423/9 |
| 4,574,072 | 3/1986 | Horwitz et al. | 423/10 |

FOREIGN PATENT DOCUMENTS 2011696 12/1977 United Kingdom.
2011697 12/1977 United Kingdom.

OTHER PUBLICATIONS

Wilson, et al. 1984, The impact of technetium on reprocessing chemistry, Intl. Meeting on Fuel Reprocessing & Waste Mgmt. Jackson Hole, Wyoming, 10 pages.
Vandegrift et al. 1984, Transuranic decontamination of nitric acid solutions by the truex solvent extraction process, Argonne Nat'l Lab. pp. 1, 45-50, 107-110.
Garraway et al. 1984, the technetium catalysed oxidation of hydrazine by nitric acid, Journal of Less Common Metals 97: 191-203.

Primary Examiner—Stephen J. Lechert, Jr.
Assistant Examiner—Howard J. Locker
Attorney, Agent, or Firm—Michael N. Meller

[57] ABSTRACT

Process for preventing the extraction of technetium and/or rhenium, particularly during the extraction of uranium and/or plutonium by an organic solvent.

This process permitting the extraction of a chemical element, such as uranium or plutonium present in an aqueous solution containing both said element, technetium and/or rhenium and zirconium and/or hafnium consists of contacting the aqueous solution with an organic solvent able to extract said element, wherein for preventing the extraction of the technetium and/or rhenium with said element, to the aqueous solution is added a zirconium and/or hafnium complexing agent in a quantity adequate for complexing all the zirconium and/or hafnium, said agent being soluble in the aqueous solution.

13 Claims, 1 Drawing Sheet

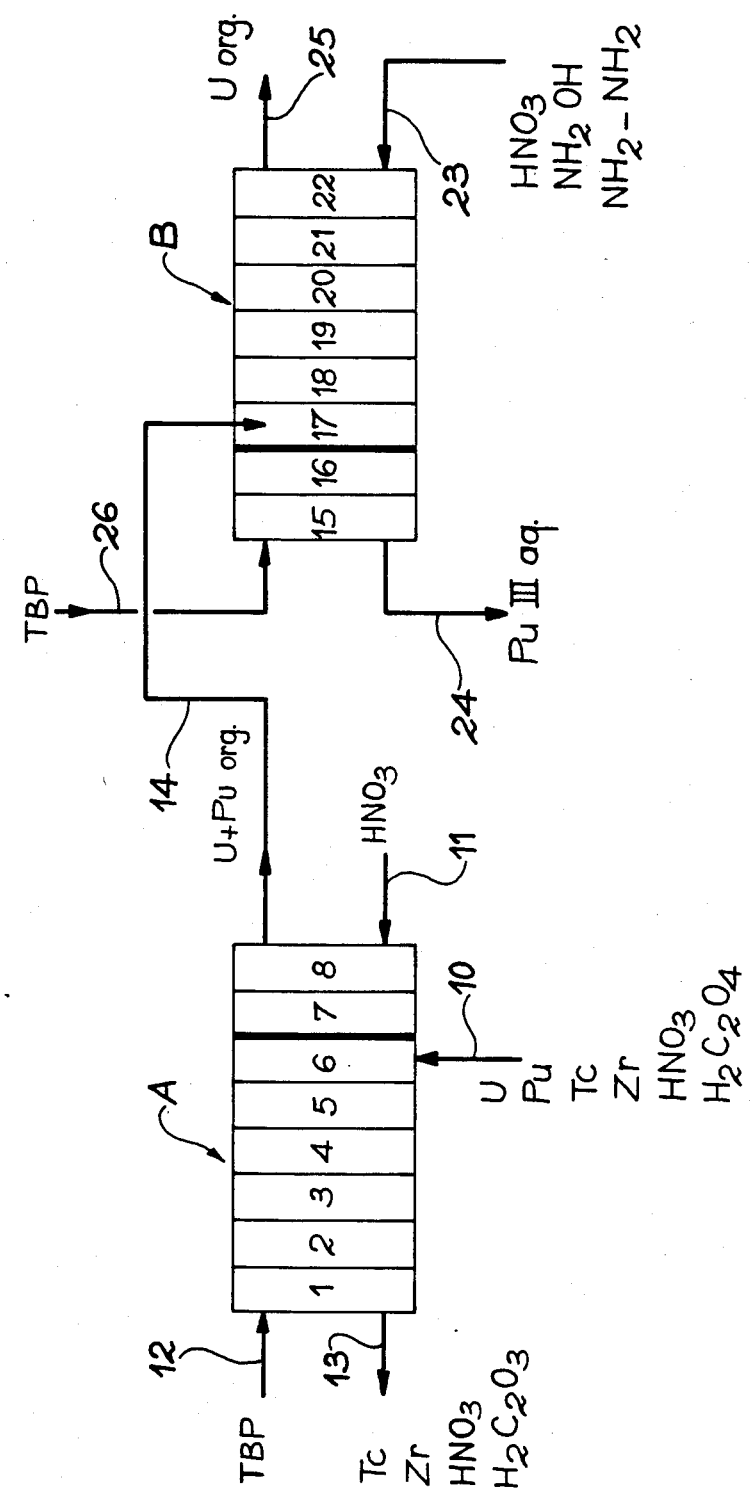

PROCESS FOR PREVENTING THE EXTRACTION OF TECHNETIUM AND/OR RHENIUM, PARTICULARLY DURING THE EXTRACTION OF URANIUM AND/OR PLUTONIUM BY AN ORGANIC SOLVENT

BACKGROUND OF THE INVENTION

The present invention relates to a process making it possible to avoid the extraction of technetium and/or rhenium, particularly during the extraction of uranium and/or plutonium by an organic solvent. It more particularly applies to the field of the reprocessing of irradiated nuclear fuels.

More specifically, the invention relates to a process making it possible to avoid the extraction of technetium and/or rhenium, present in an aqueous solution, by an organic solvent at the same time as the extraction by said solvent of one or more chemical elements contained in the aqueous solution, which also contains zirconium and/or hafnium. The chemical elements to be extracted are in particular actinides, such as neptunium, plutonium, thorium, uranium, etc.

Among the fission products produced by nuclear fuels spending time in a reactor, the attention of the chemist is particularly drawn to technetium as a result of the problems caused by its presence in the first stages of the reprocessing of irradiated fuels. A brief description will be given of the first stages of the process generally used for the reprocessing of irradiated nuclear fuels.

The process firstly consists of dissolving the irradiated fuels in a strong acid solution and in particular a nitric acid solution. In said acid solution, technetium is at valency VII in the form of pertechnetate ions ($TcO_4^-$) mixed with uranyl ions ($UO_2^{++}$) and/or $Pu^{4+}$ ions, as well as with zirconium ions and other fission products.

This aqueous solution is then brought into countercurrent contact with an organic solvent, such as tributyl phosphate having a particular aptitude for extracting the nitric complexes of $Pu^{4+}$ and $UO_2^{++}$ ions. This solvent is then charged with uranium and/or plutonium, the other chemical elements remaining in the aqueous phase.

However, it has been found that part of the pertechnetate ions were also transferred into the organic phase in the form of mixed nitric complexes of technetium and uranium or technetium and plutonium, as was reported during the International Conference on Nuclear and Radiochemistry (FRG), 8–12 Oct. 1984 by Vialard et al under the title "Some Aspects of Technetium Extraction Chemistry in the Purex Process". The same applies with respect to thorium. The article shows that the concentration of pertechnetate ions in the organic solvent is dependent on the actinide which it is wished to extract. This technetium concentration increases from uranium to plutonium and from plutonium to thorium.

It has also been found that the extraction of technetium by the organic solvent was more particularly increased in the presence of zirconium ions. It would appear that this extraction is due to the formation of a mixed nitric complex of technetium and zirconium in the organic solvent.

It is assumed that the chemical reaction which occurs is identical to that postulated for uranium or plutonium and is in the following form:

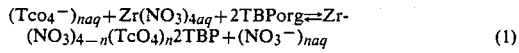

$$(Tc_{O4}^-)_{naq} + Zr(NO_3)_{4aq} + 2TBP_{org} \rightleftharpoons Zr(NO_3)_{4-n}(TcO_4)_n 2TBP + (NO_3^-)_{naq} \quad (1)$$

with n close to 1.

The existence of a mixed complex of zirconium and technetium has more particularly been demonstrated in a paper read at the International Meeting on Fuel Reprocessing and Waste Management, Wyoming, 26–29 Aug. 1984 by P. D. WILSON et al and entitled "The Impact of Technetium on Reprocessing Chemistry". The technetium quantity extracted in the form of pertechnetate ions complexed by the organic solvent is dependent on the zirconium concentration, as well as the acidity of the aqueous solution.

During the reprocessing of nuclear fuels, uranium and plutonium are generally both present in the aqueous starting solution and consequently in the organic solvent. In order to separate the uranium from the plutonium, the organic solution is countercurrent contacted with a nitric acid solution containing reducing agents making it possible to selectively reduce the plutonium of valency IV and the plutonium of valency III. The reduced plutonium can be recovered in the aqueous phase in nitrate form, whereas the uranium remains at valency VI, in the form of a nitric complex, in the organic phase.

The conventionally used reducing agents for reducing plutonium at valency III, such as iron at valency II, uranium at valency IV or hydroxylamine ($NH_2OH$) are not stable in the presence of nitric acid. Thus, these reducing agents tend to be oxidized by nitric acid. To prevent the oxidation of these reducing agents, to the nitric solution is added an anti-nitrite which serves as a stabilizer, e.g. hydrazine ($NH_2-NH_2$).

This separation of uranium VI and plutonium IV functions in a satisfactory manner in the absence of technetium, but is seriously disturbed by the presence thereof.

Thus, as described in the aforementioned article by Vialard and in another article by P. D. WILSON et al which was published in the Journal of the Less-Common Metals, 97, 1984, pp. 191–203 and entitled "The Technetium Catalysed Oxydation of Hydrazine by Nitric Acid", the presence of technetium catalyses the oxidation of hydrazine by nitric acid preventing said hydrazine from playing its part as a stabilizer of reducing agents of Pu (IV). In other words, the oxidation of hydrazine leads to the oxidation of the reducing agents, thus preventing the reduction of plutonium and consequently its reextraction in the form of nitrates in the aqueous solution. To prevent the oxidation of hydrazine by nitric acid, which is catalysed by technetium, a number of different solutions has been proposed.

The first solution relates to the separation of the uranium and plutonium. It essentially consists of increasing the hydrazine concentration of the nitric solution used in the selective reextraction of plutonium, by reduction of the latter. In this way the time available for carrying out the reextraction of plutonium before the reducing agent, generally tetravalent uranium, is oxidized is increased. It must be ensured that an excessive temperature (above 30° C.) does not lead to an opposite effect by accelerating the hydrazine destruction reactions.

This increase in the hydrazine quantity is necessarily accompanied by an increase in the hydrazine decomposition products, such as hydrazoic acid and its salts, as well as ammonium ions, which are undesirable products. Thus, it is known that hydrazoic acid, which is very volatile and extractable in organic solvents, is liable to give unstable or explosive salts. To a lesser extent, the same applies for ammoniacal compounds.

However, it is obviously not desirable and particularly in an irradiated nuclear fuel reprocessing plant containing organic solvents to increase the explosive risks.

A second solution for preventing the oxidation of hydrazine by nitric acid in the presence of technetium was proposed with respect to the simultaneous extraction by the organic solvent of the uranium and the plutonium. The elimination of the technetium with the fission products in the extraction effluents located upstream of the plutonium/uranium separation stage is a reliable method for preventing the disadvantages due to technetium during said separation stage. This is generally brought about by increasing the ratio between the flowrates of the aqueous phase and the organic phase circulating in countercurrent manner.

This method, which also has the advantage of aiding the decontamination of uranium and the plutonium with respect to fission products, unfortunately suffers from at least two major disadvantages. The first disadvantage is the increase in the effluent volumes to be evaporated for the conditioning and storage of fission products, which leads to increased investment and operating costs for the nuclear fuel reprocessing plants. The second disadvantage is the increase in the uranium and/or plutonium losses in the effluents (waste).

SUMMARY OF THE INVENTION

The present invention relates to a process making it possible to obviate the aforementioned disadvantages. This process more particularly aims at preventing the extraction of technetium by the organic solvent, particularly starting from the final joint extraction stage of the uranium and the plutonium by said solvent. This elimination of technetium, which in particular takes place before the uranium/plutonium separation stage, makes it possible to avoid the destruction of the hydrazine used for stabilizing the selective reducing agents of plutonium in nitric acid solution.

In view of the fact that in the case of the reprocessing of nuclear fuels, the extraction of technetium by an organic solvent only takes place as a result of the powerful cooperation of zirconium through the formation of a mixed organic complex of technetium and zirconium, the inventors envisaged opposing the extraction of technetium by the organic solvent by acting chemically on the zirconium.

In view of the closed chemical analogies existing between the zirconium and hafnium on the one hand and the technetium and rhenium on the other, the inventors also envisaged opposing the extraction of the rhenium simultaneously with another element present in an aqueous solution, which also contains zirconium and/or hafnium, by an organic solvent, by acting chemically on the zirconium and/or hafnium.

More specifically, the present invention relates to a process for the extraction of at least one first element present in an aqueous solution containing both said first element, at least one second element chosen from among rhenium and technetium and at least one third element chosen from among hafnium and zirconium, consisting of bringing the aqueous solution into contact with an organic solvent able to extract said first element, wherein to prevent the extraction of the second element with the said first element, to the aqueous solution is added a complexing agent of the third element in a quantity adequate for completely complexing the same, said agent being soluble in the aqueous solution.

The term complexing agent is understood to mean any chemical compound able to react with zirconium or hafnium to form a stable, soluble compound in which the oxidation state of the zirconium or hafnium is unchanged. Preferably, the second element is technetium and the third element zirconium.

The introduction according to the invention into the aqueous solution of a strong zirconium complexing agent makes it possible to strongly compete with reaction (1) of mixed complexing of technetium and zirconium in the organic solvent, thereby preventing the extraction of technetium by said organic solvent.

The process according to the invention is advantageously applied during the extraction of plutonium and/or uranium from a nitric solution by an organic solvent. Thus, during the reprocessing of irradiated fuels, it is normal for the technetium and zirconium to be present at the same time as uranium and plutonium in the dissolving solution.

Advantageously, the organic solvent is a phosphorus compound having an electron donor oxygen atom. This phosphorus compound can be neutral phosphine oxides of formula:

in which $R_1$, $R_2$ and $R_3$ are identical or different alkyl, aryl or alkoxyalkyl radicals, and the organophosphates of formula:

in which $R_1$, $R_2$, $R_3$, which are the same or different, represent an alkyl, aryl or alkoxyalkyl radical. Preferably, the organic solvent is tributyl phosphate of formula $O=P-(OC_4H_9)_3$.

According to a preferred embodiment of the inventive process, the complexing agent is an oxygen-rich hydrosoluble organic compound, such as a carboxylic acid. Examples of carboxylic acid are oxalic, glycolic, citric, tartaric and poly/monoamino acetic acids. Preference is given to the use of oxalic or glycolic acid.

These organic compounds, which have good complexing properties with respect to zirconium and hafnium are also moderate complexing agents of hexavalent actinides and very good complexing agents of tetravalent actinides and in particular plutonium, uranium and neptunium. It could therefore be feared that their use would not lead to precipitations of said actinides or would not oppose the extraction thereof.

However, the examination of the complexing reactions of zirconium and particularly those of plutonium and uranium by oxalic acid reveals that the stability constants of the zirconium complexes are higher than those of the plutonium and uranium complexes.

For plutonium and zirconium are given hereinafter the possible complexing reactions with oxalic acid ($H_2C_2O_4$) and the corresponding equilibrium constant is given for each reaction.

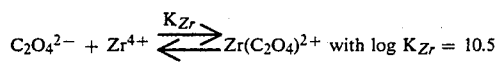

(2)

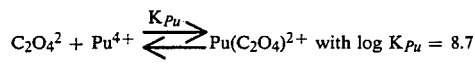

(3)

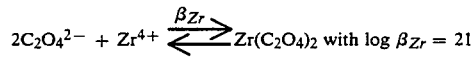

(4)

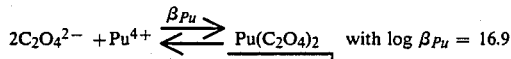

(5)

On reading the above, it can be deduced therefrom that the ratio of the stability constants $K_{Zr}/K_{Pu}$ is equal to 63 and that the ratio of the constants $\beta_{Zr}/\beta_{Pu}$ is equal to 12,600.

This demonstrates that if the oxalic acid quantity added to the aqueous solution does not exceed the stoichiometric complexing quantity (4) of zirconium, there is no need to fear the precipitation of plutonium in the form of oxalate (reaction 5) and in fact only zirconium oxalates form, which are soluble in the aqueous phase.

Thus, by ensuring that the ratio R of the oxalic acid concentration to the zirconium concentration is $1 \leq R \leq 2$, it is possible to oppose reaction (1) and therefore the extraction of technetium without any risk of precipitating the plutonium or destroying its extraction.

The same conclusions can be applied to uranium and neptunium for which the complexing reactions with oxalic acid are similar and the stability constants of the corresponding complexes are close to or below those of plutonium.

The examination of the complexing reactions of zirconium and certain actinides with oxalic acid, as well as the stability constants of the corresponding complexes are more particularly described in an article by G. F. VANDEGRIFT et al published in ANL 84-45 of June 1984 and entitled "Transuranic Decontamination of Nitric Acid Solutions by the Truex Solvent Extraction Process. Preliminary Development Studies".

DETAILED DESCRIPTION OF THE INVENTION RELATIVE TO THE DRAWING

Other features and advantages of the invention can be gathered from the following description given in an illustrative and non-limitative manner with reference to the attached drawing, which diagrammatically shows the first stages of a uranium and plutonium extraction process by means of an organic solvent, whilst preventing the extraction of technetium by said solvent.

In an extraction unit A, formed from a plurality of mixer-settler means, e.g. eight stages, namely six extraction stages 1 to 6 and two washing stages 7 and 8, at 10 is introduced an aqueous solution more particularly containing technetium at valency VII in the form of pertechnetate ions, zirconium in tetravalent form, uranium in hexavalent form, plutonium in tetravalent form, a zirconium complexing agent, such as carboxylic acid and a strong acid such as nitric acid. Glycolic or oxalic acid is advantageously chosen as the carboxylic acid.

During the reprocessing of irradiated nuclear fuels, said solution is obtained by dissolving the irradiated fuels in a nitric acid solution, to which is then added the zirconium complexing agent in a quantity sufficient for complexing the zirconium, but whilst avoiding using an excess thereof. To the supply solution introduced at 10 is added a washing solution 11 containing a strong acid, such as nitric acid.

The aqueous supply solution is countercurrent contacted in the extraction unit A with an organic solvent introduced at 12 and formed from a phosphorus compound redundant in formulas (I) or (II) and such as e.g. tributyl phosphate, known as TBP. TBP is generally dissolved in an alkane, such as dodecane. The aqueous solution leaving extraction unit A at 13 mainly contains nitric acid, oxalic or glycolic acid, zirconium and technetium. The technetium is present in the form of uncomplexed pertechnetate ions and the zirconium in complexed form with the oxalic acid (reactions 2 and 4) or glycolic acid.

The organic solvent leaving extraction unit A at 14 more particularly contains uranium VI and plutonium IV in the form of nitric complexes and substantially no technetium.

This actinide-charged organic solvent is then passed into an extraction unit B in the form of a plurality of mixer-settler means with six extraction stages 17 to 22 and two washing stages 15, 16 for countercurrent contacting with an aqueous solution introduced at 23.

This aqueous solution more particularly contains nitric acid, a reducing agent for selectively reducing the plutonium and hydrazine making it possible to stabilize the reducing agent in the nitric solution. For example, this reducing agent is uranium in the tetravalent state, iron in the divalent state or hydroxylamine ($NH_2OH$).

The aqueous solution leaving the extraction unit at 24 mainly contains plutonium at valency III in the form of nitrate, as well as hydrazine, whereas the organic solution leaving unit B at 25 mainly contains uranium at valency VI in the form of nitric complexes. In order to wash the aqueous solution of reextracted trivalent plutonium, a TBP washing solution is introduced into extraction unit B at 26.

The following examples illustrate the results obtained by performing the process according to the invention.

EXAMPLE I

This first example relates to the solubility of the plutonium in the presence of oxalic acid and complexed by zirconium. Firstly four samples of an aqueous solution were prepared having the following composition:
$HNO_3$ 3.5N
Zr $2.10^{-2}$M
Pu $210^{-2}$M
to which was added oxalic acid in such a way that the latter respectively titrates: 0, $10^{-2}$, $2.10^{-2}$ and $4.10^{-2}$M.

Following homogenization and standing for one day at ambient temperature, no precipitation of the plutonium in oxalate form was observed in these four samples. Thus, the oxalic acid is indeed complexed solely by zirconium.

EXAMPLE II

In the second example, the effect of oxalic acid on technetium extraction was studied. To a series of five samples of an aqueous solution of composition:
$HNO_3$ 3.5N
$Pu^{4+}$ 3.3 g/l
Zr 2.0 g/l ($2.10^{-2}$M)

Tc 0.888 g/l
was added increasing amounts of oxalic acid, so that the latter respectively titrates 0, $5.10^{-3}$, $10^{-2}$, $2.10^{-2}$ and $4.10^{-2}$M.

These samples were then contacted with a solution containing 30% by volume of tributyl phosphate and 70% by volume of n-dodecane previously equilibrated with a 3.5N nitric acid solution. This was followed by stirring for 5 minutes at 35° C. in the presence of said organic solution.

Into the aqueous phase of these five two-phase systems the plutonium quantity was dosed by counting and the technetium quantity by a colorimetric method.

From this were deduced the distribution or separation coefficients appearing in the following table I, in which R represents the ratio between the molar concentration of the oxalic acid and the molar zirconium concentration, $D_{Tc}$ and $D_{Pu}$ respectively represent the distribution coefficients of the technetium and plutonium, whereby the distribution coefficient of one element is equal to the ratio of the concentration of said element in the organic phase to its concentration in the aqueous phase.

TABLE I

| $H_2C_2O_4$ | R | $D_{Tc}$ | $D_{Pu}$ |
| --- | --- | --- | --- |
| 0 | 0 | 0.67 | 8.75 |
| $5 \cdot 10^{-3}$ | 0.25 | 0.77 | 9.12 |
| $1 \cdot 10^{-2}$ | 0.50 | 0.71 | 8.77 |
| $2 \cdot 10^{-2}$ | 1.0 | 0.28 | 8.11 |
| $4 \cdot 10^{-2}$ | 2.0 | 0.05 | 10.3 |

Examination of table I shows that the increase in the oxalic acid content in the aqueous solutions leads to a drop in the technetium distribution coefficients without significantly affecting those of plutonium.

EXAMPLE III

This example relates to the technetium decontamination of irradiated fuels by using oxalic acid. To simulate the extraction of uranium and plutonium during the reprocessing of irradiated nuclear fuels, four aqueous solutions of the following composition were synthetically prepared:

$HNO_3$ 3N
U(VI) 250 g/l
Pu(IV) 2 g/l
Zr g/l
Tc 0.16 g/l and to which was added oxalic acid in such a way that it titrates respectively: 0, $5.10^{-3}$, $1.5.10^{-2}$ and $2.10^{-2}$M.

In a group of laboratory mixer-settler means with six extraction stages and two washing stages were successively performed the extraction at ambient temperatures of each of the solutions by means of an organic solvent, containing 30% by volume of an organic solvent, containing 30% by volume of tributyl phosphate and 70% by volume of n-dodecane, circulating in countercurrent manner with respect to the aqueous solutions introduced at 10. Washing of the organic solvent containing uranium and plutonium was carried out by a 3M nitric acid solution introduced at 11. The aqueous supply solution flowrate is 0.14 l/h, the nitric acid washing solution flowrate 0.08 l/h and the organic solvent flowrate 0.41 l/h. The volume of each mixer is 10 ml and the volume of each settler 40 ml.

When the dynamic equilibria have been reached, the technetium is dosed into the organic and aqueous solutions respectively leaving the extraction unit A at 14 and 13.

The following table II shows the results of these analyses, as well as the value of the technetium decontamination factor ($FD_{Tc}$) of the extracted uranium and plutonium resulting therefrom. This decontamination factor is equal to the ratio between the mass flow of the technetium in the supply solution and its mass flow in the charged solvent leaving extractor A. In table II, R again represents the ratio of the molar concentration of oxalic acid to the molar concentration of zirconium.

TABLE II

| $H_2C_2O_4$ (M) | R | Tc mg/l in $HNO_3$ | Tc mg/l in TBP | $F.D._{Tc}$ |
| --- | --- | --- | --- | --- |
| 0 | 0 | 10 | 46.6 | 1.2 |
| $5.0 \cdot 10^{-3}$ | 0.5 | 20 | 40.8 | 1.3 |
| $1.5 \cdot 10^{-2}$ | 1.5 | 77 | 14.7 | 3.7 |
| $2.0 \cdot 10^{-2}$ | 2 | 82 | 10.8 | 5.1 |

Table II shows that beyond a concentration half that necessary for forming the complex $Zr(C_2O_4)_2$(equation 4), the oxalic acid has a significant reducing effect on the extraction of the technetium in the presence of zirconium and makes it possible to obtain a remarkable improvement in technetium decontamination.

However, the uranium present in high concentration and only very slightly complexed by the oxalate ions still exerts a weak coextraction power with respect to the technetium, which imposes a limit on the elimination of the latter.

The above description has clearly only been given in an illustrative and explanatory manner, the inventive process having a much broader scope. Thus, it can be used in any process for the extraction of a chemical element and in particular an actinide other than uranium and/or plutonium from an aqueous solution containing both technetium and zirconium by an organophosphorus solvent other than TBP using any strong zirconium complexing agent, which is soluble in aqueous solution. In particular, the process according to the invention can be used during the extraction of neptunium or thorium alone or mixed with uranium or plutonium.

In general terms, the process according to the invention is used in all cases where it is wished to oppose an extraction aided by the presence of zirconium. Moreover, in view of the close chemical analogies existing between zirconium and hafnium on the one hand and technetium and rhenium on the other, the zirconium complexing agents effectively oppose the extraction of technetium and rhenium when the latter is dependent on the presence of zirconium or hafnium.

What is claimed is:

1. A process for the extraction of at least one first element selected from the group consisting of actinides and present in an aqueous solution containing both said first element, at least one second element selected from the group consisting of rhenium and technetium and at least one third element selected from the group consisting of hafnium and zirconium, said process comprising the steps of bringing the aqueous solution into contact with an organic solvent comprising a phosphorous compound having only one electron donor oxygen atom and able to extract said first element, in order to prevent the extraction of the second element with the said first element, adding to the aqueous solution a complexing agent of the third element in a quantity adequate for completely complexing said third element, said agent being soluble in the aqueous solution.

2. A process according to claim 1, wherein the second element is technetrium and the third element is zirconium.

3. A process according to claim 1, wherein the complexing agent is a carboxylic acid.

4. A process according to claim 3, wherein the complexing agent is oxalic acid.

5. A process according to claim 3, wherein the complexing agent is glycolic acid.

6. A process according to claim 1, wherein the first element is uranium.

7. A process according to claim 1, wherein the organic solvent is tributyl phosphate.

8. A process according to claim 1, wherein the aqueous solution is a nitric acid solution.

9. A process according to claim 1, wherein the first element is plutonium.

10. A process according to claim 1, wherein the organic solvent is selected from the group consisting of a neutral phosphine oxide and an organophosphate.

11. A process according to claim 1, wherein the first element is selected from the group consisting of neptunium, plutonium, uranium and thorium.

12. A process according to claim 1, wherein the complexing agent is oxalic acid and the third element is zirconium.

13. A process according to claim 12, wherein the ratio R of the oxalic acid concentration to the zirconium concentration is $1 \leq R \leq 2$.

* * * * *